141-256

Examiner's Room

2 Sheets--Sheet 1

SAMUEL TAGGART.

Improvement in Flour Packers.

No. 4,626. Reissued Nov. 7, 1871.

Witnesses:
[illegible] Wagner
S. H. Boal

*Inventor:*
Samuel Taggart
by
Johnson & Klaucke & Co
Attorneys

AM. PHOTO-LITHOGRAPHIC CO. N.Y. (OSBORNE'S PROCESS.)

2 Sheets--Sheet 2.

SAMUEL TAGGART.

Improvement in Flour Packers.

No. 4,626. Reissued Nov. 7, 1871.

*Witnesses:*

Ernst Wagner.

S. N. Tove

*Inventor:*

Saml. Taggart by

Johnson & Klauckes & Co

Attorneys

BEST AVAILABLE COPY

UNITED STATES PATENT OFFICE.

SAMUEL TAGGART, OF INDIANAPOLIS, INDIANA.

IMPROVEMENT IN FLOUR-PACKERS.

Specification forming part of Letters Patent No. 24,063, dated August 2, 1859; reissue No. 4,626, dated November 7, 1871.

*To all whom it may concern:*

Be it known that I, SAMUEL TAGGART, of Indianapolis, in the county of Marion and State of Indiana, have invented certain new and useful Improvements in Flour-Packers, of which the following is a full and exact description, reference being had to the accompanying drawing and the letters marked thereon.

Figure 1:
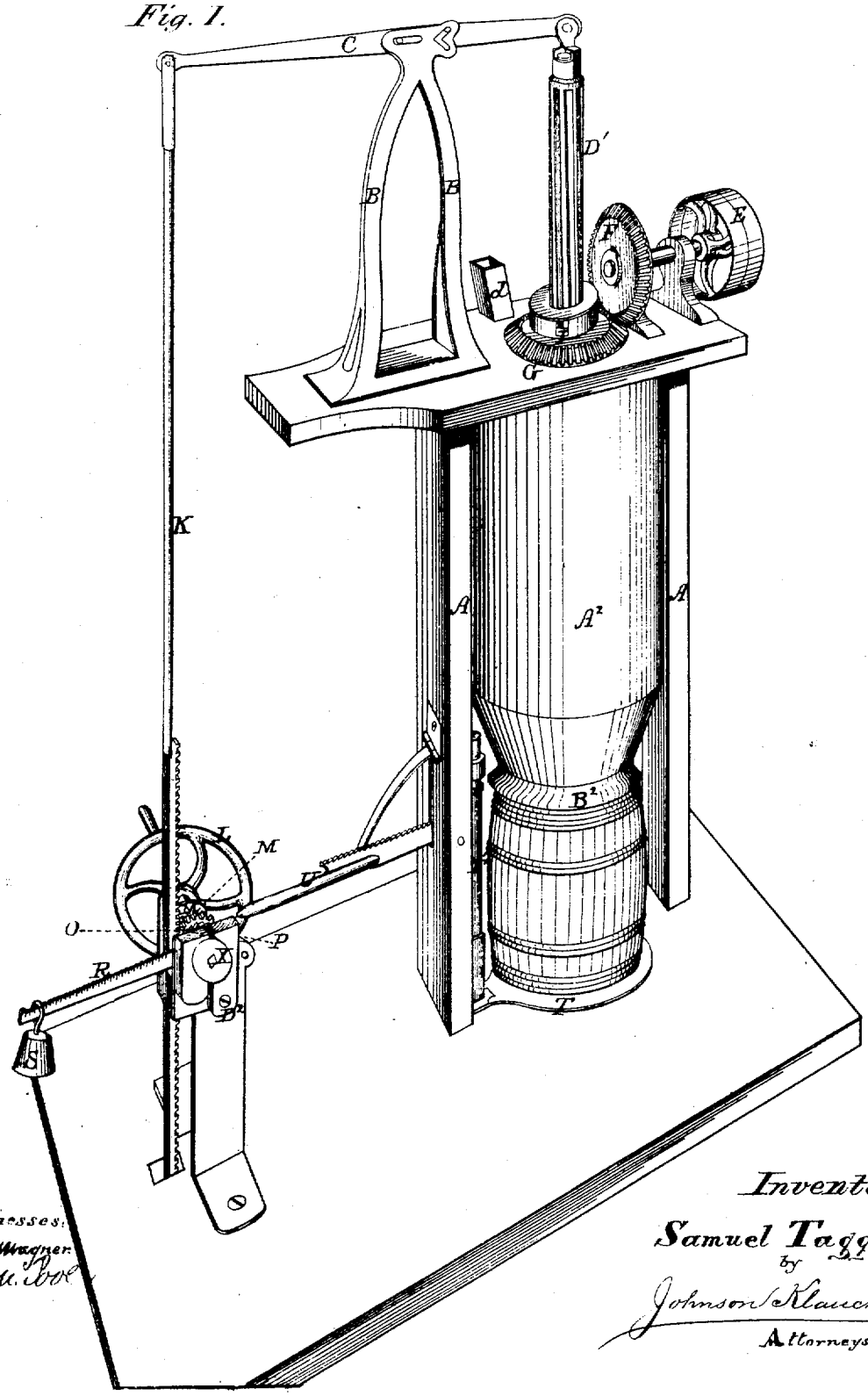
Figure 4:
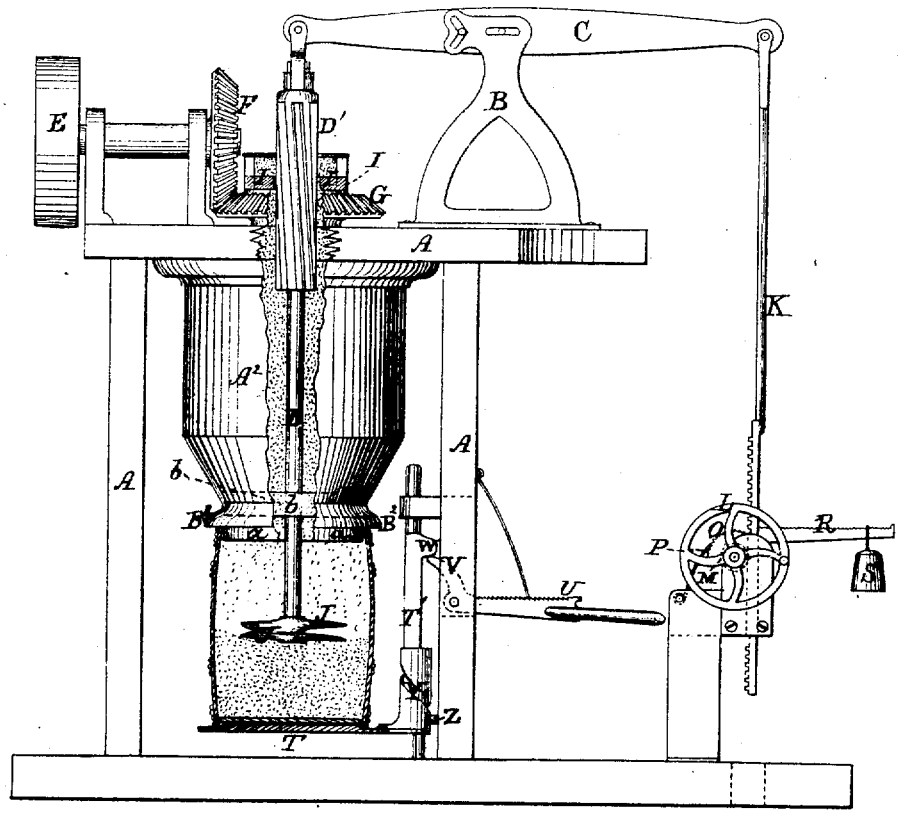
Figure 2:
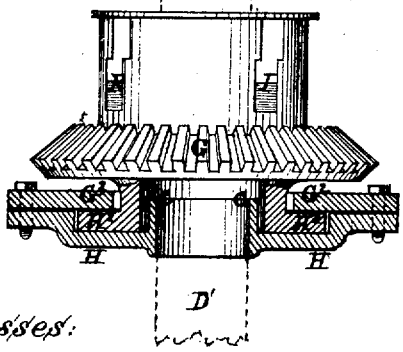
Figure 3:
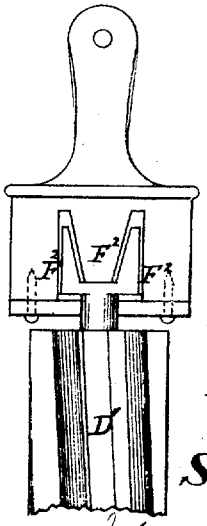

In the drawing, Figure 1 represents a view in perspective, showing the construction and general arrangement of the machine and especially of the friction-weighted brake for the packing-shaft. Fig. 2 represents a sectional view, showing the oil-chamber and bearings for the clutch-wheel and packing-shaft. Fig. 3 represents a sectional view, showing the bearing by which the packing-shaft is suspended, and its oil-cup. Fig. 4 represents a side elevation of the machine, the barrel being shown in section and the flour-tube broken away to show the packing-shaft.

The advantages of the various combinations, arrangements, and devices by which I accomplish what has not been done by other packers will be understood from the fact that the objects sought in the perfection of the whole invention have been first and chiefly the construction of an auger-packer which is entirely portable—that is to say, one that may be placed in mills already constructed without interfering with their machinery or its arrangement, or cutting the floor or floors of the mill—that it may be placed in one story, and thereby take the place of those which heretofore occupied two or three stories in height, passing through several floors of the mill, and which required to be constructed in section, taken to the mill, and put up by sections in the different stories by a millwright; and, further, to produce a packer that will be much less expensive, occupy little room, and that is brought within the reach of millers of small capital. In perfecting this branch of my invention the greatest difficulty was to so weigh the packing-blades that a comparatively short shaft—that is, of less height than a story—could be used to put the proper weight of one hundred and ninety-six pounds in the barrel without regard to its size. In the stationary flour-packers, extending through several stories, the long packing-shaft did not need so much weighting; but with my portable short shaft packer it was of the highest importance to accomplish the proper weighting of the shaft, and the perfection of this desideratum produced the hitherto unknown portable auger flour-packer; and the invention thereof of the combination of a weighted friction-brake with a packing-shaft for regulating the pressure of the auger upon the flour while packing and thereby to regulate the weight and density of the flour packed in each barrel by the automatic action of the packing-blades, whether the barrel be large or small. In the perfection of this branch of my invention I arrange two interior bearings for the packing-shaft so as to obtain the necessary support therefor without a fixed bearing above clutch-wheel. My invention further consists in means for centering and supporting the bearing of the clutch-wheel in an oil-chamber, and in forming in the same device the upper inner bearing of the packing-shaft. My invention also consists in the construction of a pivoted swinging barrel-lifter or platform, by which the barrel may be carried and adjusted centrally beneath the flour-tube and packing-shaft and released therefrom and swung out automatically when it is filled; the movement of the lifter being entirely independent of the floor of the mill.

I will now refer to the parts of the machine as they are lettered in order to show its construction.

A A A A is the frame, to which is attached the whole of the machinery of the packer. B is an upright frame, designed to support the lever or walking-beam C, which operates the packing-shaft D to raise and lower it. E is a pulley, over which a belt passes to operate the bevel-wheel F, which gears with and gives motion to the clutch-wheel G, whose bearing is centered within an oil-cup, H, which gears with and gives motion to the clutch-wheel G, whose bearing is centered within an oil-cup, H, and which communicates to the packing-shaft its revolving motion. The ribs or wings D′ upon the upper portion of the packing-shaft D serve as levers upon the clutch-plate I I to revolve the shaft, and these ribs or wings fit into recesses in the clutch-plate to allow the packing-shaft to be raised and lowered while it is also revolved, and thus causes the substance to recede from the flat surface of the blade while being packed in the barrel under pressure. The two-lipped auger J J has two

BEST AVAILABLE COPY cones and is attached to the lower end of the packing-shaft D. The packing is automatically effected by the spiral blades; the flour resting upon their upper sides is screwed through the issues to their under sides under the pressure of a weighted brake. The issues perfectly balance the lateral resistance upon the shaft and thus relieve it of vibrations, springing, or working out of center, and prevents all side pressure upon its bearings, which is of great advantage in a short shaft. The barrel, moreover, stands steadier and the substance is left in a more even condition to head up by the balancing issues of the packing-blades, as they leave the flour uniformly even from the center to the verge of the barrel. The toothed rod K operates the walking beam C, and is itself operated by the hand-wheel L and toothed wheel or pinion M—that is to say, the pressure of the auger upon the flour operates the beam C and its connecting rod under the weight of the brake automatically—while the operator manipulates the hand wheel L to lower the auger J into the barrel by reversing the motion of the drum against binding tendency of the brake. The pawl P works in the ratchet-wheel O, which is upon the same shaft with the hand-wheel L and friction brake-drum, so that the ratchet-wheel may turn as the rod K descends and the packing-shaft ascends, but the pawl must be freed from the ratchet-wheel to allow the auger to pass into the empty barrel. The axial movement of the packing-shaft is started and stopped at the proper time by an automatic clutch, such as described in my patent of 1854. The friction-brake is operated by a lever, R, and weight S, so as to produce the proper degree of packing pressure upon the flour, as will be more fully hereafter described. The barrel-lifter is composed of a platform, and upright T T′, the latter working in guides or loops, which are attached to the main frame so as to allow it to rise and fall, and simultaneously therewith swivel upon its post for the purpose of swinging the barrel round from beneath the flour-tube. U is a handle or lever, by which its cam V is operated under the projection or bearing W to automatically swing and adjust the barrel, the operation of which will be described more fully hereafter. The friction drum X of the weighted brake is upon the same shaft with the hand-wheel L, the ratchet-wheel O, and pinion M.

The following is the operation of the machine: The barrel being placed upon the platform T the lever U is depressed and its cam V is raised, and, sliding under the projection W, elevates the barrel-lifter T. As the latter is raised a fixed pin, Z, working in the inclined part of a slot or groove Y, of the swiveling post throws the lifting-platform automatically round until it reaches a position directly under the mouth of the flour-tube $A^2$, when the groove Y, running perpendicularly, holds the barrel from any side motion while it is raised to the mouth of the flour-tube $A^2$ and held firmly against the annular horizontal projection $B^2$ by the cam V, so that the barrel cannot be moved by the operation of the auger in packing, nor can any flour escape over the top of the barrel. This result cannot be accomplished where the annular horizontal projection or shoulder is not used, because with the tapering mouthed-tube the barrel must either fit loosely upon the same, or the hoops are in danger of being burst off; while by my plan the pressure of force is against the ends of the staves and does not injure the barrel. The flange $B^2$ rests upon the ends of the staves and the rim *a* enters within the barrel, forming a closed joint and preventing the material from being forced out with the atmosphere by the pressure of the packing blades when being lowered into the barrel. In this position of the empty barrel the packing shaft is lowered, the auger running down to the bottom of the same. This is done by lifting the pawl P from the ratchet O and operating the hand-wheel L so as to raise the rod K and cause the walking beam C to turn upon its fulcrum in the frame B and force the ribs or flanges of the packing shaft D down through the openings or passages made for the purpose in the clutch plate I I; the flour or other material in the tube $A^2$ resting upon the auger as the latter descends is screwed through its issues as it revolves rapidly, and is laid in thin layers under the pressure or force applied to the packing auger by the friction-brake, which I will now describe more particularly.

In the example shown it is composed of two parts or pieces of wood or other material so formed as to surround or embrace the friction-drum X. The fulcrum $D^2$ of the brake is placed in the lower edge of the part to which the lever R is secured.

The advantages of this brake are seen in the fact that it can be made to act with a variable force to increase or diminish the pressure upon the flour, with a long or short packing-shaft, to produce the exact weight, or nearly so, in the barrel while the flour is being packed. The hand-wheel affords great facility for raising and lowering the auger, and especially for lowering it into the empty barrel, during which the brake is relieved by the reverse motion of the drum. By the use of a brake and weighted lever in connection with a packing-shaft the operator can vary the amount of flour, or the density to which the same is packed, instantly by the sliding weight S upon the lever R toward or from the brake.

In the operation of the machine the weight of the flour in the barrel is determined approximately by the weight of the brake, and then weighing the filled barrel upon scales. If there be too little flour in the barrel I move the weight toward the end of the lever; if too much, the weight is moved toward the brake, the weight being only to regulate the pressure of the auger on the flour when packing; but in this way the brake is set so as to pack in every barrel one hundred and ninety-six pounds or a little over rather than under; and then in weighing on the flour-scales the surplus is taken out of the barrel.

A very important advantage results from the combination of the hand-wheel with the friction

BEST AVAILABLE COPY brake and packing-shaft in enabling the attendant, in lowering the packing auger into the barrel, to obtain the benefit of the partial action of the brake, and thus prevent the too sudden descent of the shaft. The motion of the friction-drum in lowering the auger tends to open the jaws of the brake and thus relieve the friction very considerably; but the brake will still bite sufficiently upon the drum to overcome the weight of the packing shaft to a degree that will effect and insure its safe descent to the bottom of the barrel, and thus greatly relieve the labor of the operator in this movement.

The top of the shaft D, as shown in Fig. 3, is constructed with an oil-cup, in which the bearing $F^2$ rests as the shaft D is revolved, by which arrangement a safety oil-cup is formed, insuring a good supply of oil without danger of greasing the packing-shaft and making the friction at the point of suspension very light. By the use of the oil-cup H H, with cap $G^2$ $G^2$ holding the flange $H^2$ $H^2$ of the clutch-wheel G, makes it unnecessary to have more than one bearing or journal for the clutch-wheel; and by the arrangement of two interior bearings, one, *c*, within the oil-cup of the clutch-wheel, and the other, *b*, at the bottom of the flour-tube, I am enabled to shorten the packing-shaft, dispense with the fixed bearing above the clutch-wheel, and place the whole machine in the single story of a mill without diminishing the capacity of the machine.

The oil-reservoir and bearing for the clutch-wheel G is formed in a fixed plate, H, which also serves as a bearing for the packing-shaft by having a tubular portion or sleeve *c* for that purpose. The horizontal bearing forms the oil-cup, and being an annular chamber forms also a centering bearing for an annular flange on the clutch-wheel, and thus maintains its central position with the packing-shaft.

The cam end V of the lever U, which operates the barrel-lifter, is so constructed that when the barrel begins to be raised the bearing against the projection W being nearly over the center of the axis of the swiveling-post raises the barrel slowly, but gradually increasing in motion as the cam rises more rapidly. As the barrel is brought near the annular projection or shoulder $B^2$ the motion is again decreased from the fact that the bearing of the cam is brought nearer to a vertical line with its own pivot of motion, and that at that part the bearing-surface of the cam approaches a circle of which its pivot is the center.

The advantages gained by this swinging lifter and cam-lever are: First, it prevents concussion when starting and stopping the swinging motion of the barrel. Secondly, that it gives a great leverage for holding the barrel in place while packing.

The great advantages this machine possesses over all others are shown in the fact that while its operation is perfectly simple, it does its work better and performs double or treble the amount of work performed by any other packer.

The flour is fed into the feeding-tube through a spout, *d*.

I have shown and described a packing-blade having two issues; but it is obvious that a greater number may be used so long as they balance each other and are on the same horizontal plane.

It is also obvious that sacks may be packed as well as barrels.

I have shown one of the commonest forms of brakes, but it is obvious that any desired construction of variable weighting-brake may be used in connection with a packing-shaft so long as the results herein described are attained.

Having described my invention, I claim—

1. A portable auger packing machine having a short packing-shaft and a pressure-controlling brake, and the several parts constructed and arranged to occupy a single floor of a mill instead of two or three stories as heretofore, as described.

2. In a machine for packing flour and other substances, having a packing-shaft and auger, the combination therewith of a variable brake for increasing or diminishing the packing pressure upon the flour when required, essentially as described.

3. The combination, substantially as described, of a packing-shaft and auger with means for connecting it with a controllable brake, consisting of the lever C, connecting-rod K, and pinion M, as described.

4. In combination with a friction-weighted brake and a packing shaft, the hand-wheel L for controlling the descent of the packing-shaft into the barrel, as described.

5. The upper bearing for the packing-shaft and the bearing for the clutch-wheel formed in one and the same fixed plate, as described.

6. The oil-chamber for the clutch-wheel, constructed and arranged to serve also as an annular centering guide thereto, as described.

7. The barrel-lifter, constructed and arranged to have an automatic lateral swinging movement to deliver the filled barrel out of the way of the filling-tube, as described.

8. A barrel-lifter, having a vertical swiveling post connected to the frame by guides to admit of its descent, and an oblique guide arranged to be operated by a fixed projection, by the weight of the filled barrel, to impart thereto a lateral swinging movement from beneath the flour-tube, as described.

9. The combination of the swinging barrel-lifter with the operating cam-lever U V, guide Y, and fixed projection Z, as described.

10. The guide Y and fixed projection Z, constructed and operating to both swing the filled barrel laterally out of the way and arrest the unfilled one centrally with the filling-tube, as described.

In testimony whereof I have hereunto set my hand.

SAML. TAGGART.

Witnesses:

RUFUS DAVISSON,
G. B. GAINES.